US009579787B2

(12) United States Patent
Zimmermann et al.

(10) Patent No.: US 9,579,787 B2
(45) Date of Patent: Feb. 28, 2017

(54) METHOD OF PROGRAMMING AN INDUSTRIAL ROBOT AND INDUSTRIAL ROBOTS

(71) Applicant: KUKA Roboter GmbH, Augsburg (DE)

(72) Inventors: Uwe Zimmermann, Augsburg (DE); Volker Schmirgel, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/831,543

(22) Filed: Aug. 20, 2015

(65) Prior Publication Data

US 2016/0052128 A1 Feb. 25, 2016

(30) Foreign Application Priority Data

Aug. 20, 2014 (DE) .......................... 10 2014 216 514

(51) Int. Cl.
*B25J 9/00* (2006.01)
*B25J 9/16* (2006.01)

(52) U.S. Cl.
CPC ........... *B25J 9/0081* (2013.01); *B25J 9/1628* (2013.01); *B25J 9/1633* (2013.01);
(Continued)

(58) Field of Classification Search
CPC ...... B25J 9/0081; B25J 9/1628; B25J 9/1633; G05B 2219/36433; G05B 2219/39201;
(Continued)

(56) References Cited

U.S. PATENT DOCUMENTS 4,756,662 A 7/1988 Tanie et al.
2009/0105880 A1* 4/2009 Okazaki ................. B25J 9/1633
700/258
(Continued)

FOREIGN PATENT DOCUMENTS

DE 10302592 A1 7/2004
DE EP 1950010 A2 * 7/2008 ........... G05B 19/423
(Continued)

OTHER PUBLICATIONS

German Patent Office; Office Action in German Patent Application No. 10 2014 216 514.8 dated Jan. 9, 2015; 4 pages.
(Continued)

*Primary Examiner* — Khoi Tran
*Assistant Examiner* — Robert Nguyen
(74) *Attorney, Agent, or Firm* — Wood Herron & Evans LLP

(57) ABSTRACT

The invention concerns a method of programming an industrial robot, exhibiting the steps of selecting a program command, the assigned rigidity parameter of which is to be verified, changed and/or saved in the program mode; moving the manipulator arm into a test pose, in which the industrial robot is configured and/or arranged to manually touch and/or move the manipulator arm; and the automatic actuation of the manipulator arm by the control device such that the manipulator arm in the test pose exhibits the rigidity corresponding to the assigned rigidity parameter of the selected program command. The invention further concerns an industrial robot, exhibiting a control device designed and/or configured to execute such a method.

18 Claims, 4 Drawing Sheets

(52) U.S. Cl.
CPC ............. *G05B 2219/36433* (2013.01); *G05B 2219/39201* (2013.01); *G05B 2219/39319* (2013.01); *G05B 2219/39338* (2013.01); *G05B 2219/39346* (2013.01); *G05B 2219/39347* (2013.01); *G05B 2219/39348* (2013.01); *Y10S 901/04* (2013.01)

(58) Field of Classification Search
CPC ........... G05B 2219/39319; G05B 2219/39338; G05B 2219/39346; G05B 2219/39347; G05B 2219/39348; Y10S 901/04
USPC .............................................. 700/261; 901/4
See application file for complete search history.

(56) References Cited

U.S. PATENT DOCUMENTS

| | | | |
|---|---|---|---|
| 2010/0286826 A1* | 11/2010 | Tsusaka | B25J 9/1633 |
| | | | 700/254 |
| 2011/0015787 A1* | 1/2011 | Tsusaka | B25J 9/0003 |
| | | | 700/264 |
| 2011/0190932 A1* | 8/2011 | Tsusaka | B25J 13/08 |
| | | | 700/254 |
| 2014/0081460 A1 | 3/2014 | Ando et al. | |
| 2015/0081098 A1* | 3/2015 | Kogan | B25J 9/1656 |
| | | | 700/258 |
| 2015/0142171 A1* | 5/2015 | Li | B25J 9/1692 |
| | | | 700/251 |

FOREIGN PATENT DOCUMENTS

| | | |
|---|---|---|
| DE | 102007062108 A1 | 7/2009 |
| DE | 102008027008 A1 | 12/2009 |
| DE | 102009018403 A1 | 10/2010 |
| DE | 102010029745 A1 | 12/2011 |
| DE | 102012009010 A1 | 12/2012 |
| EP | 1950010 B1 | 4/2013 |
| JP | 2010058202 A | 3/2010 |
| WO | 2010088959 A1 | 8/2010 |

OTHER PUBLICATIONS

European Patent Office; Search Report in European Patent Application No. 15181061.1 dated May 18, 2016; 9 pages.

\* cited by examiner

METHOD OF PROGRAMMING AN INDUSTRIAL ROBOT AND INDUSTRIAL ROBOTS

CROSS-REFERENCE TO RELATED APPLICATIONS

This application claims the benefit of priority under 35 U.S.C. §119(a) to German Patent Application DE 10 2014 216 514.8, filed Aug. 20, 2014 (pending), the disclosure of which is hereby incorporated by reference in its entirety.

TECHNICAL FIELD

The invention concerns a method of programming an industrial robot, the robot including a manipulator arm and a control device to actuate the manipulator arm, which is designed to move the manipulator arm according to a robot program that is editable in a program mode and executable in an execution mode, which contains at least one program command to which is assigned at least one rigidity parameter via which, in the course of an in execution mode automatic execution of the robot program, the control device is prompted to automatically actuate the manipulator arm in a manner that is force- and/or torque-controlled according to the at least one rigidity parameter.

BACKGROUND

A method to program a robot is known from EP 1 950 010 B1. As a generally known programming method, it mentions so-called teach-in programming, in which movement information for the robot can be compiled by approaching desired spatial points with the aid of an appropriate device, for example a programmable handheld device or a control panel, and by acquisition of these spatial points into the robot control. The so-called play-back method, in which the programming of a process occurs via manual guidance of the robot along a desired spatial curve, is another described type of programming. The actual position values, i.e. the axis positions or the TCP position (Tool Center Point Position) of the robot in a defined time or path grid, are adopted into the robot program. In a particular type of programming, the rigidity/flexibility of the robot in the course of the demonstration of a processing procedure can also be recorded.

SUMMARY

An object of the invention is to provide a method of programming an industrial robot, with which the industrial robot can be programmed in a simple and precise manner via manually guided movement of the manipulator arm. It is in particular an object of the invention to improve, in particular to simplify, the programming of the flexibility and/or rigidity of the manipulator arm.

An object of the invention is solved with a method of programming an industrial robot, the robot including a manipulator arm and a control device to actuate the manipulator arm, which is designed to move the manipulator arm according to a robot program that is editable in a program mode and executable in an execution mode, which contains at least one program command to which is assigned at least one rigidity parameter via which, in the course of an in execution mode automatic execution of the robot program, the control device is prompted to automatically actuate the manipulator arm in a manner that is force- and/or torque-controlled according to the at least one rigidity parameter, comprising the steps:

selecting of a program command, the assigned rigidity parameter of which is to be verified, changed and/or saved in the program mode, moving the manipulator arm into a test pose, in which the industrial robot is configured and/or arranged to manually touch and/or move the manipulator arm, and automatically actuating the manipulator arm by the control device such that the manipulator arm in the test pose exhibits the rigidity corresponding to the assigned rigidity parameter of the selected program command.

Manipulator arms with associated robot controls, in particular industrial robots, are machines that can be equipped with tools for the automated handling and/or processing of objects, and are programmable in multiple movement axes, e.g. with respect to orientation, position and operating sequence. Industrial robots typically include a manipulator arm with multiple links, connected via joints, and programmable robot controls (control devices), which automatically control or regulate the motion sequences of the manipulator arm during operation. The links are moved by drives, in particular electric drives, which are actuated by the robot control, in particular in relation to the movement axes of the industrial robot, which represent the degrees of freedom of motion of the links.

Manipulator arms can, for example, comprise a frame and a carousel, which is rotatably mounted in relation to the frame via a joint, to which a link arm is pivotably mounted via another joint. An arm jib can in turn be pivotably mounted on the link arm via a further joint. The arm jib carries a robot hand, whereby in this respect the arm jib and/or the robot hand can include multiple additional joints. A manipulator arm having multiple links connected via joints can be configured as an articulated arm robot with multiple serially arranged links and joints. The manipulator arm can in particular be configured as a six axis articulated arm robot.

Manipulator arms with associated robot controls, such as industrial robots, can however, in particular, also be so-called lightweight robots, which at first glance distinguish themselves from conventional industrial robots in that they exhibit a favorable size for human-machine cooperation, and also exhibit a carrying capacity that is high in relation to their own weight. In addition, like other industrial robots, lightweight robots can in particular be operated in a force- and/or torque-controlled manner, for example in a flexibility control or rigidity control, instead of in a position-controlled manner, which simplifies the manual adjustment of the pose of the manipulator arm, for instance. Safe human-machine cooperation can be achieved with this as well, because unintended collisions of the manipulator arm with people, for example, can either be prevented or at least be softened enough that there is no harm to the person. Such a manipulator arm, i.e. such a lightweight robot, can have more than six degrees of freedom so that, in this respect, an overdetermined system is created, whereby the same point in the space can be reached in the same orientation in several different poses of the manipulator arm. The lightweight robot can react to external forces in appropriate ways. Force sensors, which can measure forces and torques in all three spatial directions, can be used for force measurements. Alternatively, or additionally, the external forces can also be estimated without special sensors, e.g. by using the measured motor currents of the drives on the joints of the lightweight robot. Indirect force control, via modeling of the lightweight robot as a mechanical resistance (impedance), or direct force control can, for example, be used as control concepts.

Manually touching and/or moving the manipulator arm is, in particular, understood to mean that the current joint positions of the manipulator arm can be changed by an operator of the industrial robot grasping the manipulator arm at one or more of its joints and changing, i.e. adjusting, the pose of the manipulator arm, for example, by pushing, pulling and/or turning the grasped joint. In a basic design example, a handle can be mounted, for example, or at least a grip area can be provided, in particular rigidly fixed, on the last link in the kinematic chain of the manipulator arm, i.e. on the hand flange of the manipulator arm, via which a guiding force can be introduced into the mechanical structure of the manipulator arm. Such a guiding force, applied to the manipulator arm by the operator of an industrial robot, can be measured directly, for example by sensors specifically designed and configured for that purpose, in particular force sensors, or indirectly calculated from measured values at already present joint sensors, in particular force/torque sensors of the manipulator arm, or indirectly determined from motor currents of the drives of the joints of the industrial robot. Inventively, manually touching and/or moving the manipulator arm also includes simple holding of the manipulator arm in the space, so that it maintains its current pose unchanged. In this respect, manually touching and/or moving the manipulator arm generally means manual handling of the manipulator arm, which also includes holding it in an unchanged pose.

The pose of the manipulator arm is generally understood as the sum of all joint positions of joints of the manipulator arm, which adjustably connect the individual links of the manipulator arm. In a narrower sense, for a clearly specified system, pose can also already be understood, for example, as the position and orientation of a reference point, such as e.g. a tool reference point (Tool Center Point/TCP) of the manipulator arm. The tool reference point can be formed, for example, by a suitable point on a hand flange of the manipulator arm, to which a gripper, a tool or some other device is attached, so as to be able to move it in the space by adjusting the pose of the manipulator arm. Quite generally, the tool reference point can also be a virtual spatial point outside the manipulator arm that is, however, geometrically rigidly connected with one of the links of the manipulator arm, in particular the hand flange of the manipulator arm.

An inventive test pose can be characterized by the fact that the manipulator arm adopts joint angle positions in which an area of the manipulator arm provided and/or selected for manual grasping, for example a particular link of the manipulator arm, is particularly favorably and/or safely accessible for an operator. In the test pose the operator can manually touch and/or move the manipulator arm in such a way, that the operator can sense or feel the currently actuated flexibility or rigidity of the manipulator arm.

A robot program forms a control specification in the manner of which the control device is to automatically actuate the manipulator arm, i.e. its joints, so as to allow the automatic execution of the desired movements and actions of the manipulator arm. For this purpose a robot program contains program commands, which, for example, describe specific types of movements. A program command can, however, also only concern the setup of a state or a property of the manipulator arm. At least one parameter can be assigned to each program command. In the event of a position command, the at least one parameter can, for example, be formed by the X, Y, and Z position values of a tool reference point in Cartesian space. In other cases the parameter can be a speed, a maximum acceleration or a flexibility or rigidity value, for example, that in this respect represents a property of the manipulator arm. Program-controlled, the manipulator arm can automatically assume this property, in particular also across several support points. The flexibility or rigidity values assigned to a program command represent the rigidity parameter assigned to the respective program command. If, within the scope of the present invention, only rigidities and/or rigidity parameters are mentioned, it means that this includes the flexibilities and/or the flexibility parameters in terms of their significance. In this respect, within the scope of the invention, the rigidity parameters represent the property of the manipulator arm set by the control device, which can also be referred to as "elasticity," "softness" and/or "hardness" of the manipulator arm. Mathematically viewed, the flexibility parameter is the reciprocal of the rigidity parameter.

In particular in execution mode, the actuation of the drives of the industrial robot can occur via impedance control or admittance control. In this respect, the control device can be adjusted to create the flexibility or rigidity control of the manipulator via impedance control or admittance control.

With appropriate controller parameterization, an industrial robot, in particular a lightweight robot, can have a variety of Cartesian, i.e. axis-specific, flexibilities or rigidities. Examples of Cartesian rigidities will be considered in the following; however, the statements also apply to axis-specific rigidities. Moreover, the terms "rigidity" and "flexibility" are used in an essentially synonymous manner, because mathematically the rigidity is the reciprocal of the flexibility. Aside from the rigidities, it is also possible to parameterize the attenuations. This is not explicitly discussed in the following; however, within the scope of the invention, rigidity parameters may also include attenuation parameters.

The forces that a flexibility-controlled robot exerts on an operating point depend on two variables: on the programmed rigidity parameters, on the one hand, and on the distance between the operating point and the programmed target point on the other.

In robot programs the rigidity can be set in a separate command and remains in effect until a new set of parameters for the rigidity is programmed.

When programming tasks, the programmer generally proceeds as follows. He selects a, in his opinion, suitable rigidity and programs a, likewise in his opinion, suitable target point. He then lets the robot execute the task and observes the result. Through modification of the rigidity or the target point, he then attempts to optimize the task in such a way that it is solved successfully. To do this, he must infer, from the observation of the executed movement of the industrial robot, how to change which parameter so as to achieve a satisfactory result of the task solution.

A basic problem in programming according to the state of the art here is that programmers only receive visual feedback. This is in particular problematic in the case of rigidity parameters, because here, unlike for other typical parameter values, there is only an unclear perception of the effect of the physical quantity. In other words, rigidities and/or flexibilities cannot be seen; they have to be sensed or felt by touching the manipulator.

For positions or speeds, it is relatively easy to "see" that the robot has to move a little "deeper" or "slower," for example. Based only on observations, even the decision, whether the robot needs to be set to be softer or harder, is not always clear-cut. This is complicated even more, in particular by the simultaneous effectivity of, for example, six rigidity values (in x, y and z direction and the respective rotational rigidities around x, y and z). In addition there is the fact that, while people generally have a good mental image of physical quantities, such as "2 mm" or "2 m/s," this is less likely to be the case for rigidities, such e.g. "10 N/mm" or "3 Nm/rad."

In principle it would be helpful if the programmer could feel the current rigidity parameterization by touching the manipulator. Purely theoretically this "feeling" is possible if the programmer stops the program at the appropriate point, i.e. on the track, and, without restarting the program, touches the manipulator and feels the current parameterization. However, on the one hand, accessibility is not always assured, i.e. it is not always possible to touch the manipulator in the appropriate position, and, on the other hand, it is unsafe, because the manipulator is generally in close proximity to work pieces or other objects. The manipulator can also be in contact with the work piece, so that the rigidities may not even be discernible, because, in a manner of speaking, the robot is being forcibly actuated.

A further problem with the conventional way of programming is that the rigidities cannot automatically be fixedly assigned to one point. Thus, to test a specific program section or a specific program command via record selection, it is not enough to only select the desired point (e.g. LINE P5); rather it is also necessary to execute the corresponding additional command "setrigidity" to set the rigidity parameter applicable for the desired point.

EXAMPLE

| 10 | setrigidity (10, 20, 10, 0, 0, 0) |
| 20 | LIN P1 |
| 30 | PTP P2 |
| 40 | LIN P3 |
| 50 | setrigidity (100, 100, 100, 100, 100, 100) |
| 60 | LIN P4 |
| 70 | PTP P2 |
| 80 | LIN P5 |
| ... | |

If, in this example of a program section, the movement LIN P5 in line 80 is to be tested, line 70 would traditionally be selected, the robot would be moved to point P2 and then the linear movement LIN P5 would be executed. For programmed rigidities, however, the corresponding preceding line must first be found and executed. In this case then, execute line 50: setrigidity (100, 100, 100, 100, 100, 100) first, and continue with line 70.

With such a traditional approach, however, errors in the operation and programming of industrial robots can easily occur, if the programmer forgets to execute the command to set the rigidities.

In order to give the programmer a better idea of the effective flexibility in a point, or in a track, the inventive methods are suggested to allow the programmer to directly feel the set rigidities in a safe way.

By moving the manipulator arm into a test pose in which a selected rigidity of a selected position or a selected pose of the manipulator arm is automatically set, a user, or a programmer, can feel the rigidity that the manipulator arm would have in the selected position or in the selected pose by touching in the test pose. In doing so the test pose distinguishes itself from the selected position or selected pose of the manipulator arm. The test pose can be a safe position or safe pose of the manipulator arm, in which there is no risk for the user or the programmer. This can, for example, already be the case when the manipulator arm is moved away from a work piece and/or tool. In the test pose, the manipulator arm can, for example, be moved out of a safety enclosed work cell, so that a user or a programmer outside the secured work cell can touch the manipulator arm to feel the rigidity.

In a first alternative embodiment of the invention the movement of the manipulator arm into the test pose, in which the industrial robot is configured and/or arranged for manual touching and/or moving of the manipulator arm, occurs automatically or manually before the selection of a program command, the assigned rigidity parameter of which is to be verified, changed and/or saved in the program mode, is conducted.

In a second alternative embodiment of the invention, the movement of the manipulator arm into the test pose, in which the industrial robot is configured and/or arranged for manual touching and/or moving of the manipulator arm, occurs automatically or manually after the selection of a program command, the assigned rigidity parameter of which is to be verified, changed and/or saved in the program mode, was conducted.

In general, the selection of a program command, the assigned rigidity parameter of which is to be verified, changed and/or saved in the program mode, can thus be conducted before or after the manipulator arm is moved into the test pose.

To select the program command to be tested, i.e. its assigned rigidity, the control device, or a manual control unit connected with the control device, can include a first input device, and the selection of a program command, the assigned rigidity parameter of which is to be verified, changed and/or saved in the program mode, can occur via manual operation of the first input device.

To do this, therefore, it is enough to select only the program command to be tested, whereby the rigidity assigned to this program command is automatically determined as well. For the user or the programmer there is no longer a need to manually search out or select the rigidity. The correct setting of the rigidity to be tested can thus not be overlooked and the wrong rigidity can also not accidentally be selected.

To ensure that the respective rigidity assigned to the point, the pose and/or the track is set automatically, even in the event of record selection, i.e. when selecting the desired robot program line, a corresponding set of parameters for the rigidity can be assigned to each program command. In this case, the robot control automatically ensures that the corresponding parameterized rigidities are set when the move command is executed. This can occur in an analogous manner to known programming solutions, such as, for example, when setting track-related tool and base frames or speeds. The use of subroutines would be another application example.

The control device, or a manual control unit connected with the control device, can include a second input device, and the automatic actuation of the manipulator arm by the control device, such that the manipulator arm in the test pose has the rigidity corresponding to the assigned rigidity parameter of the selected program command, in this design variant should not occur until the second input device is actuated.

The control device, or a manual control unit connected with the control device, can exhibit a third input device, and the rigidity parameter of the selected program command is changed via manual operation of the third input device.

In doing so, the third input device can include at least two switching states in addition to an idle state, and the rigidity parameter of the selected program command can be increased by manual activation of the first switching state, and the rigidity parameter of the selected program command can be decreased by manual activation of the second switching state.

The control device, or a manual control unit connected with the control device, can include a fourth input device, and the selected, set and/or currently by the control device on the manipulator arm actuated rigidity is then stored as the new rigidity parameter assigned to the selected program command via manual operation of the fourth input device.

The four input devices can be four different mechanical or virtual sensing devices, switches and/or touch surfaces. The four input devices can also be combined in a common control element, such as a joystick or a 3-D mouse, in any variation and numbers.

How programming of the rigidity parameters can be made easier for the programmer is described in the following with the aid of an example of an embodiment. Two approaches to simplify programming are illustrated, each of which is suitable on its own. The two approaches can in particular be used in combination.

The first approach describes a point-based rigidity parameterization, which ensures that the appropriate rigidity parameter is always selected when selecting and starting a movement.

The second approach allows the programmer to directly feel the rigidities set at a point by touching the robot, thus giving him a better impression of the current parameterization than simply observing the system would. He can, therefore, very quickly assess whether the selected parametrization is appropriate, or what has to be changed and how.

In a further embodiment of the inventive method, in the test pose, the at least one rigidity parameter can be set at a reference point of the manipulator arm corresponding to the selected program command. The reference point of the manipulator arm is that at which the control device in execution mode would set the rigidity corresponding to the robot program on the manipulator arm.

In an alternative embodiment, in the test pose, the at least one rigidity parameter can be set at a reference point of the manipulator arm deviating from the selected program command, in particular moved to a grip location on one of the links of the manipulator arm predetermined as a reference point.

In all suitable design variants, a reference coordinate system can be assigned to the at least one rigidity parameter, and the orientation of the reference coordinate system can be changed while maintaining the test pose of the manipulator arm, in particular changed in such a way that the reference coordinate system in the test pose takes on an orientation in relation to a world coordinate system it would also take on during the execution of the selected program command in execution mode.

In alternative embodiments a reference coordinate system can be assigned to the at least one rigidity parameter, and the test pose of the manipulator arm can be automatically changed in such a way that the orientation of the reference coordinate system in the changed test pose corresponds to the orientation in relation to a world coordinate system that the reference coordinate system would also take on during the execution of the selected program command in execution mode.

In general, multiple program commands of the robot program can be processed incrementally and consecutively in accordance with a method as described, in particular by operation of the fourth input device, in which the selected, set and/or currently by the control device on the manipulator arm actuated rigidity is stored as the new rigidity parameter assigned to the selected program command via manual operation of the fourth input device, by jumping from one selected program command to the next consecutive program command in the robot program.

An object of the invention is further solved with an industrial robot, having a robot control designed and/or configured to execute a robot program, and including a manipulator arm with at least three joints, which are adjustable in an automated manner in accordance with the robot program and/or automatically in a manual operation, whereby the robot control is designed and/or configured to implement a method as described.

Specific, representative design examples of industrial robots operable in accordance with the inventive method are discussed in more detail in the following description with reference to the attached figures. Independent of which specific context they are mentioned in, specific features of these design examples can, if necessary individually or in combination, represent general features of the invention.

DETAILED DESCRIPTION

Figure 1:
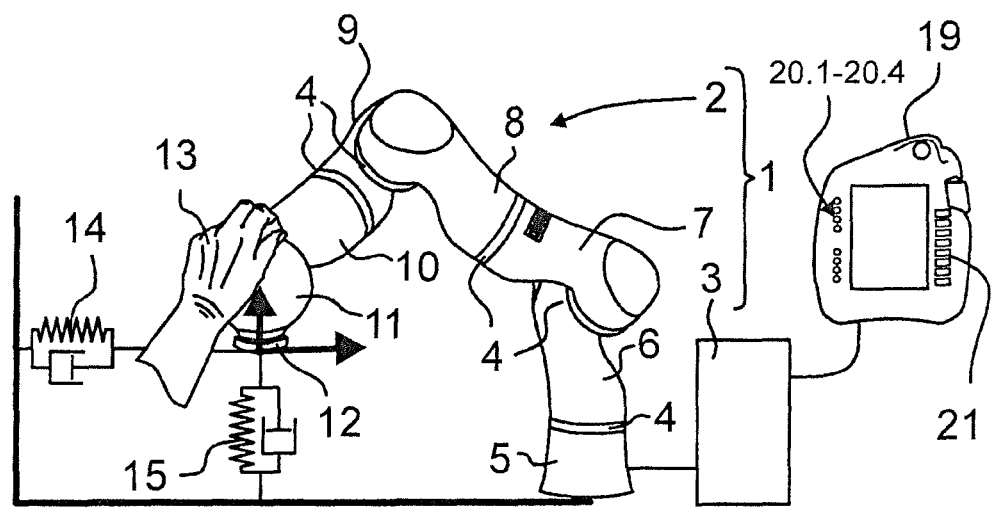
FIG. 1 a representation of an industrial robot in the type of a lightweight robot with a schematically depicted robot control and a manipulator arm in a rigidity control, FIG. 2 a schematic representation of the hand of a programmer, the manipulator arm according to FIG. 1 and a work piece with an example of an operating point P1 on the work piece, FIG. 3 a schematic representation of the hand of a programmer, the manipulator arm according to FIG. 1 and the work piece with the example of an operating point P1 on the work piece, whereby the manipulator arm is an inventive test pose, FIG. 4 a schematic representation of the hand of a programmer, the manipulator arm according to FIG. 1 and the work piece with the example of an operating point P1 on the work piece, whereby the manipulator arm is an inventive test pose and the hand is grasping a grip area of the manipulator arm, FIG. 5 a schematic representation of the manipulator arm grasped in the test pose according to FIG. 4, in which the reference base of the rigidity parameters on the link of the manipulator arm to be grasped is aligned in the same relative way as on the work piece reference point, FIG. 6 a schematic representation of the manipulator arm grasped in the test pose according to FIG. 4, in which the orientation of the reference base of the rigidity parameters in space is maintained, despite a different alignment of the link of the manipulator arm to be grasped and the work piece flange, and FIG. 7 a schematic representation of the manipulator arm grasped in the test pose according to FIG. 4, in which the link of the manipulator arm to be grasped is aligned according to a reference base of the rigidity parameters or according to the orientation of the work piece flange.

FIG. 1 shows an industrial robot 1 in an example of a design as a so-called lightweight robot, including a manipulator arm 2 and a robot control 3. In the case of the present design example, the manipulator arm 2 comprises multiple, consecutively arranged links 5 to 12, which are rotatably connected to one another via joints 4.

The robot control 3 of the industrial robot 1 is designed and/or configured to execute a robot program with which the joints 4 of the manipulator arm 2 can be adjusted or rotated in an automated manner in accordance with the robot program or automatically in a manual operation. For this purpose the robot control 3 is connected to actuable electric drives, designed to adjust the joints 4 of the industrial robot 1.

The robot control 3 is designed and/or configured to implement a method of programming the industrial robot 1, as described in more detail in the following by means of specific design examples.

In a rigidity control or flexibility control of the industrial robot 1, forces, torques, poses and directions in a depicted test pose can be learned. In such an inventive test pose, the manipulator arm 2 can be manually touched and/or moved by at least one hand 13 of a user. With his hand, the user can feel and verify the current rigidity or flexibility of the manipulator arm 2. The existing rigidity or flexibility corresponds to a spring effect, illustrated schematically in FIG. 1 in two spatial directions, using the example of spring attenuator symbols 14 and 15 shown in the plane.

According to FIG. 1, the manipulator arm 2 is operated via the robot control 3 in an active flexibility control.

Figure 2:
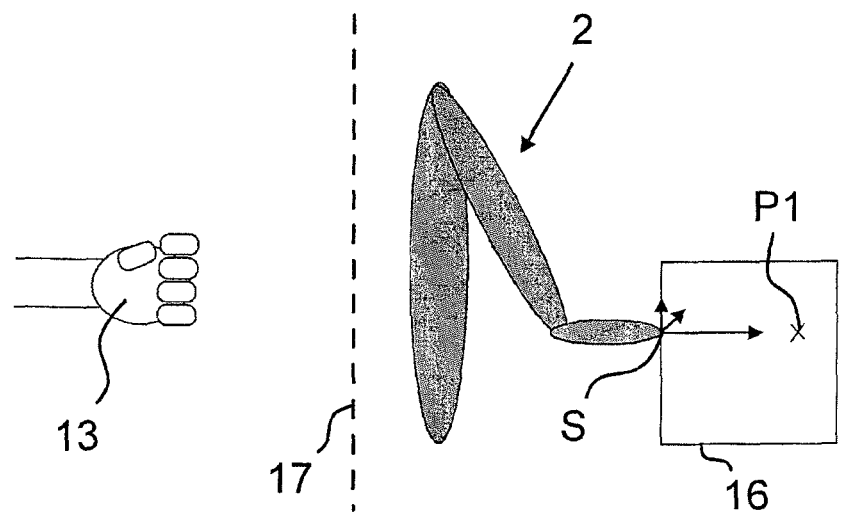

In FIG. 2, the manipulator arm 2 is in an operating position on a work piece 16 with an example of an operating point P1 on the work piece 16. In the operating position of the manipulator arm 2, the hand 13 of a user cannot approach the manipulator arm 2. This can be the case, for example, when the manipulator arm 2 is in an enclosed work cell 17, or even when an approach of the hand 13 to the manipulator arm 2 may in principle be possible, but would be too dangerous to actually carry out. The rigidity parameters S are shown in the figures at their reference bases in the form of vectors.

Figure 3:
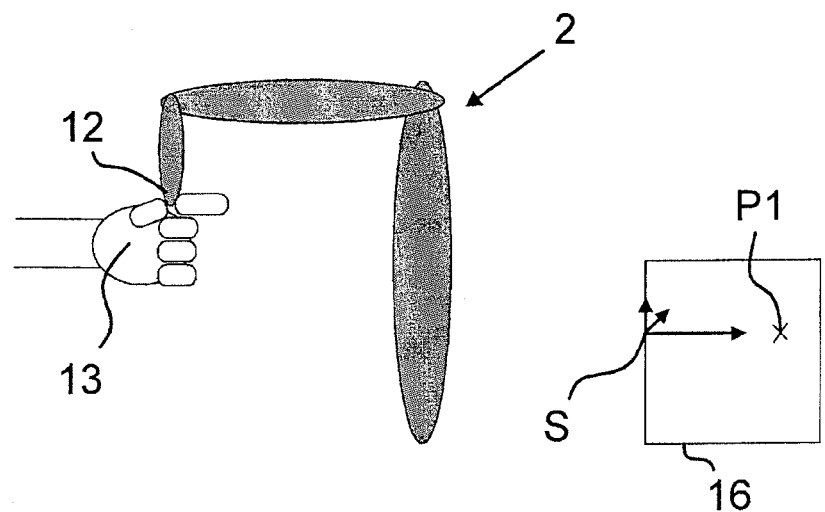

The fundamental inventive method is illustrated in FIG. 3.

The manipulator arm 2 is moved, via the control device 3, into a particularly easily accessible, and for the programmer easily manageable, position, the test pose, as is shown e.g. in FIG. 3 to FIG. 7. This corresponds to step 30 depicted in FIG. 8. The manipulator arm 2 can be moved into the test pose automatically or manually, i.e. guided by hand. The programmer now selects a movement record in the program, corresponding to step 32 depicted in FIG. 8. By actuating an input device, the rigidity parameterization valid for the selected movement record is adopted, without movement of the manipulator arm 2. This corresponds to step 34 depicted in FIG. 8. The manipulator arm 2 thus remains in the depicted test pose. However, in the test pose the manipulator arm 2 has the rigidity it would also have there in the execution pose (FIG. 2) in accordance with the selected movement record in the program.

Figure 4:
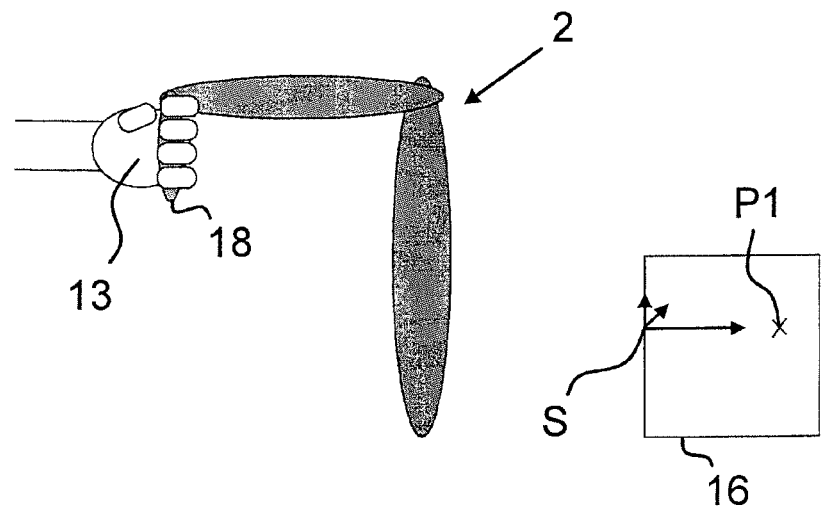

After actuation of an enabling switch, the programmer can verify the set rigidities by touching the manipulator arm 2 in the test pose. The setting of the rigidities of the manipulator arm 2 corresponds exactly to the settings according to the selected movement record in the program. Thus, for logical reasons, the user touches the manipulator arm 2 at the last link 12, as shown in FIG. 3, or at the robot flange, to verify the set rigidity by manual touching an/or moving. A separate handle 18 may, however, also be provided, as shown in FIG. 4, that is fixedly connected to one of the links of the manipulator arm 2, in particular the last link 12 or the link 11. If necessary, a link of the manipulator arm 2 can also serve directly as a handle 18.

The programmer can modify the rigidity parameters and immediately, in particular directly, feel the changes. After actuation of another input device, the modified rigidity parameters can be adopted for the selected movement record.

Figure 5:
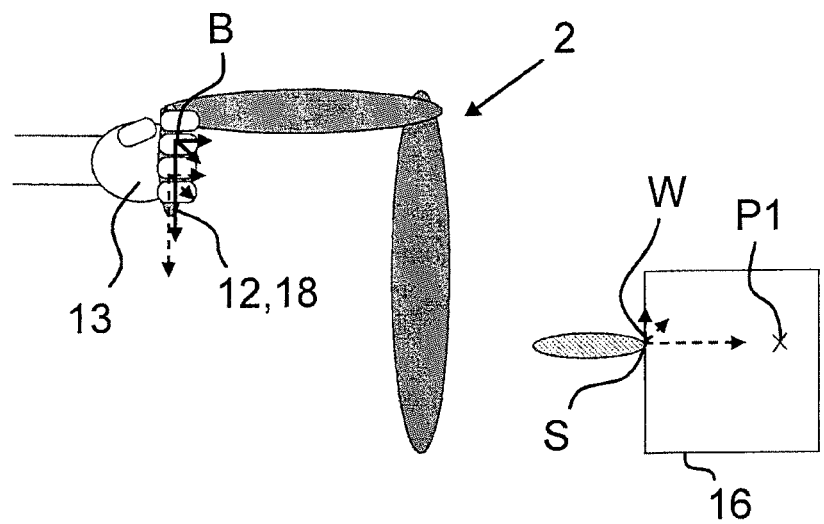

FIG. 5 shows the manipulator arm 2 gripped in the test pose, in which the reference base B of the rigidity parameters Son the link 12 to be gripped or handle 18 of the manipulator arm 2 is aligned in the same relative manner as on the tool reference point W.

In this respect, a transferral of the center of rotation from the tool reference point W into the link 12 or the handle 18 occurs. As a rule the rigidities, in particular the rotational rigidities, are programmed in relation to the tool reference point W, for example a gripper midpoint or contact point. To be able to obtain a realistic haptic perception, the center of rotation can be transferred to where it can best be felt by the programmer.

Figure 6:
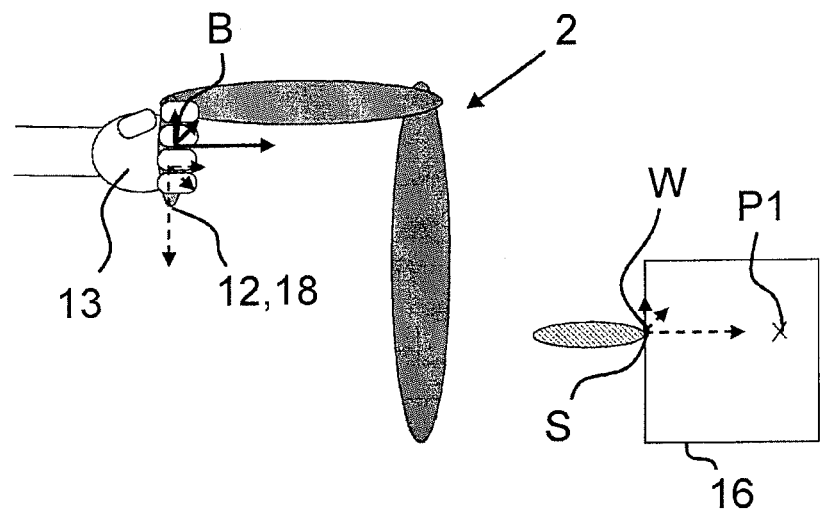

FIG. 6 shows the manipulator arm 2 grasped in the test pose in which the orientation of the reference base B of the rigidity parameters in space is maintained, despite a different alignment of the link 12 or the handle 18 of the manipulator arm 2 to be grasped and the tool reference point W.

In this respect, a transformation of the rigidity vectors according to the programmed orientation occurs. In order to obtain a better reference to the actually programmed point, the coordinate systems can be transformed accordingly, so that they again match in relation to the world coordinates. If, for example, the robot is to have a low rigidity in z-direction (tool coordinate systems) in a program and, based on the programmed orientation, this corresponds to the x-coordinate in the world coordinate system, on activation of this option the rigidity in the test pose is parameterized in such a way that this low rigidity is aligned in x-direction in the world coordinate system as well, even if this does not correspond to the z-direction in the tool coordinate system.

Figure 7:
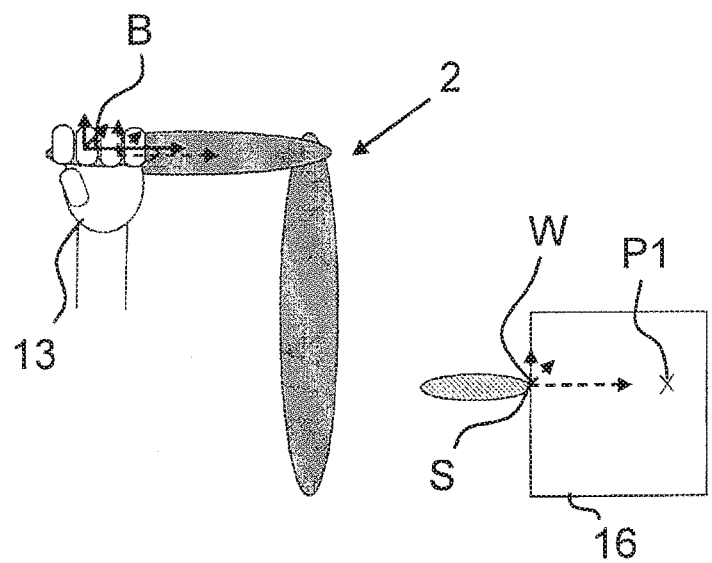
Figure 8:
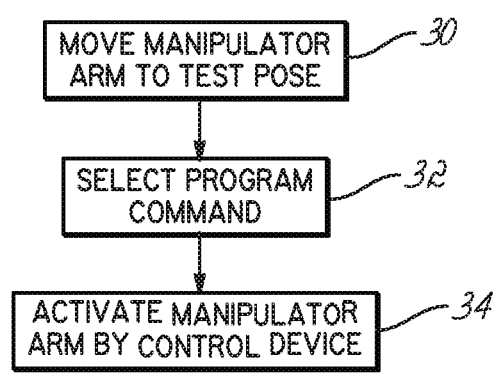
FIG. 8 is a flowchart illustrating an exemplary method in accordance with the present disclosure.

FIG. 7 shows the manipulator arm grasped in the test pose, in which the orientation of the reference base B of the rigidity parameters in space is maintained, despite a different alignment of the link 12 or the handle 18 of the manipulator arm 2 to be grasped and the work piece flange.

In doing so, the orientation in the test pose can be changed automatically so that it corresponds to the programmed orientation. The advantage is an even more realistic image.

In all design variants, the various functionalities can be initiated on the robot control 3 via the input devices 20.1, 20.2, 20.3 and 20.4. For this purpose, as schematically depicted in FIG. 1 for example, a manual control unit 19 can include corresponding input devices 20.1, 20.2, 20.3 and 20.4. In addition, the modification of the rigidity parameters can occur via simple plus/minus keys 21, for example, in particular for each of the 6 coordinates. The rigidity parameters are then increased or lowered by a defined adjustable amount.

For a simple complete run of a program (rigidity simulation run), after actuation of an input device 20.1, 20.2, 20.3 and 20.4 and/or 21, it is not only possible to adopt the potentially modified parameters; the next movement record can also be selected right away and the corresponding new parameters can be set. Consequently one of the input devices 20.1, 20.2, 20.3 and 20.4 can be omitted, and the programmer can execute the program step-by-step. The appropriate record in the program is displayed, but only the programmed rigidity is set; the movement is not executed.

The actual pose/position of the currently sensed point can also be visually displayed on a monitor by means of a virtual robot model, in particular including virtual work pieces, or visualized via augmented reality.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method of programming an industrial robot, the robot including a manipulator arm and a control device to actuate the manipulator arm, the control device configured to move the manipulator arm according to a robot program that is editable in a program mode and executable in an execution mode, wherein the robot program contains at least one program command to which is assigned at least one rigidity parameter via which, in the course of an automatic execution of the robot program in the execution mode, the control device is caused to automatically actuate the manipulator arm in a manner that is at least one of force- or torque-controlled according to the at least one rigidity parameter, the method comprising:
    selecting a program command, the assigned rigidity parameter of which is to be at least one of verified, changed or saved in the program mode;
    moving the manipulator arm into a test pose in the program mode, wherein the test pose is different from the pose associated with the selected program command and the pose of the manipulator arm is changeable by manual touching or moving by an operator; and
    automatically actuating the manipulator arm by the control device such that the manipulator arm in the test pose exhibits the rigidity corresponding to the assigned rigidity parameter of the selected program command.

2. The method of claim 1, wherein moving the manipulator arm into the test pose is performed automatically or is manually initiated before selecting the program command having the assigned rigidity parameter that is to be verified, changed, and/or saved in the program mode.

3. The method of claim 1, wherein moving the manipulator arm into the test pose occurs automatically or is manually initiated after selecting the program command having the assigned rigidity parameter that is to be at least one of verified, changed or saved in the program mode.

4. The method of claim 1, wherein the control device or a manual control unit connected with the control device includes a first input device, and wherein selecting the program command having the assigned rigidity parameter that is to be verified, changed, and/or saved in the program mode occurs via manual operation of the first input device.

5. The method of claim 1, wherein the control device or a manual control unit connected with the control device includes a second input device, and wherein automatically actuating the manipulator arm by the control device such that the manipulator arm in the test pose exhibits the rigidity corresponding to the assigned rigidity parameter of the selected program command does not occur until the second input device is actuated.

6. The method of claim 1, wherein the control device or a manual control unit connected with the control device includes a third input device, and wherein the rigidity parameter of the selected program command is changed via manual operation of the third input device.

7. The method of claim 6, wherein the third input device includes at least two switching states in addition to an idle state, and wherein the rigidity parameter of the selected program command is increased by manual activation of the first switching state, and the rigidity parameter of the selected program command is decreased by manual activation of the second switching state.

8. The method of claim 1, wherein the control device or a manual control unit connected with the control device includes a fourth input device, and wherein at least one of the selected, set, or currently actuated rigidity is stored as a new rigidity parameter assigned to the selected program command via manual operation of the fourth input device.

9. The method of claim 1, further comprising:
    setting at least one rigidity parameter in the test pose as a reference point of the manipulator arm corresponding to the selected program command, wherein the control device sets the rigidity corresponding to the robot program at the reference point in the execution mode.

10. The method of claim 1, further comprising:
    setting at least one rigidity parameter in the test pose as a reference point of the manipulator arm, wherein the reference point deviates from the selected program command.

11. The method of claim 10, wherein the reference point is moved to a grip location on a link of the manipulator arm that had been predetermined as a reference point.

12. The method of claim 1, further comprising:
    assigning a reference coordinate system to the at least one rigidity parameter; and
    changing the orientation of the reference coordinate system while maintaining the test pose of the manipulator arm.

13. The method of claim 12, wherein changing the orientation of the reference coordinate system comprises changing the orientation to correspond to an orientation relative to a world coordinate system that the reference coordinate system would have during the execution of the selected program command in the execution mode.

14. A method of programming an industrial robot, the robot including a manipulator arm and a control device to actuate the manipulator arm, the control device configured to move the manipulator arm according to a robot program that is editable in a program mode and executable in an execution mode, wherein the robot program contains at least one program command to which is assigned at least one rigidity parameter via which, in the course of an automatic execution of the robot program in the execution mode, the control device is caused to automatically actuate the manipulator arm in a manner that is at least one of force- or torque-controlled according to the at least one rigidity parameter, the method comprising:
    selecting a program command, the assigned rigidity parameter of which is to be at least one of verified, changed or saved in the program mode;
    moving the manipulator arm into a test pose in the program mode, wherein the pose of the manipulator arm is changeable by manual touching or moving by an operator;
    automatically actuating the manipulator arm by the control device such that the manipulator arm in the test pose exhibits the rigidity corresponding to the assigned rigidity parameter of the selected program command;

assigning a reference coordinate system to the at least one rigidity parameter; and automatically changing the test pose of the manipulator arm such that the orientation of the reference coordinate system corresponds to an orientation relative to a world coordinate system that the reference coordinate system would have during the execution of the selected program command in the execution mode.

15. The method of claim 1, wherein the control device contains a plurality of program commands, and wherein the method further comprises incrementally and consecutively processing each of the plurality of program commands by jumping from one selected program command to the next consecutive program command in the robot program.

16. The method of claim 15, wherein the control device or a manual control unit connected with the control device includes an input device, and wherein jumping from one selected program command to the next consecutive program command is accomplished by manual operation of the input device.

17. The method of claim 16, wherein at least one of the selected, set, or currently actuated rigidity is stored as a new rigidity parameter assigned to the selected program command via manual operation of the input device.

18. An industrial robot having a control device configured to execute a robot program and having a manipulator arm with at least three joints that are adjustable in an automated manner in accordance with the robot program and/or automatically in a manual operation, wherein the robot program is editable in a program mode and executable in an execution mode, wherein the robot program contains at least one program command to which is assigned at least one rigidity parameter via which, in the course of an automatic execution of the robot program in the execution mode, the control device is caused to automatically actuate the manipulator arm in a manner that is at least one of force- or torque-controlled according to the at least one rigidity parameter, the control device comprising a non-transitory storage medium including program code that, when executed by the control device, causes the control device to:

select a program command, the assigned rigidity parameter of which is to be at least one of verified, changed or saved in the program mode;

move the manipulator arm into a test pose in the program mode, wherein the test pose is different from the pose associated with the selected program command and the pose of the manipulator arm is changeable by manual touching or moving by an operator; and automatically actuate the manipulator arm such that the manipulator arm in the test pose exhibits the rigidity corresponding to the assigned rigidity parameter of the selected program command.

* * * * *